United States Patent [19]
Krider

[11] 3,934,259
[45] Jan. 20, 1976

[54] ALL-SKY CAMERA APPARATUS FOR TIME-RESOLVED LIGHTNING PHOTOGRAPHY

[75] Inventor: Edmund Philip Krider, Tucson, Ariz.

[73] Assignee: The United States of America as represented by the Secretary of the Navy, Washington, D.C.

[22] Filed: Dec. 9, 1974

[21] Appl. No.: 530,882

[52] U.S. Cl. ................................................ 354/94
[51] Int. Cl.² ........................................ G03B 37/00
[58] Field of Search ...................................... 354/94

[56] References Cited
OTHER PUBLICATIONS
Uman, "Lightning", 1969, Chapter 2, McGraw Hill.

*Primary Examiner*—John M. Horan
*Attorney, Agent, or Firm*—R. S. Sciascia; P. N. Critchlow

[57] ABSTRACT

A pair of all-sky cameras each equipped with a 220° Fisheye-Nikkor lens are disposed with their lenses pointing vertically. One of the cameras is rotated about an axis passing through the zenith while the other is maintained in a stationary disposition or, if desired, counter-rotated. Because of the relative rotational movement of the film of the cameras, there is a measure of displacement between the images formed on the respective films and the angular deviation produced by the displacement can be measured to determine the time development of lightning discharge.

6 Claims, 2 Drawing Figures

ALL-SKY CAMERA APPARATUS FOR TIME-RESOLVED LIGHTNING PHOTOGRAPHY

BACKGROUND OF THE INVENTION

The present invention relates to the photographic study of lightning discharges and, in particular, to time-resolved lightning photography for analyzing the time development of the discharges.

Techniques for time-resolved lightning photography have provided much valuable information regarding the luminous processes occurring during the discharges. For example, the classical photographic studies by Schonland, Malan, and co-workers in South Africa (1935); Malan and Collens (1937); Schonland (1956) and McEachron and co-workers in the United States (1939, 1947), all employed cameras patterned after a design produced by C. V. Boys (1926, 1929). If desired, reference can be made to the following publications:

Boys, C. V., 1926: Progressive Lightning. Nature, 118, 749–750.
Boys, C. V., 1929: Progressive Lightning. Nature, 124, 54–55.
Schonland, B. F. J., D. J. Malan, and H. Collens, 1935: Progressive Lightning, Pt. 2. Proc. Roy. Soc. (London), A152, 595–625.
Malan, D. J., and H. Collens, 1937: Progressive Lightning, Pt. 3, The Fine Structure of Lightning Return Strokes. Proc. Roy. Soc. (London), A162, 175–203.
McEachron, K. B., 1939: Lightning to the Empire State Building. J. Franklin Inst., 227, 149–217.
Hagenguth, J. H., 1947: Photographic Studies of Lightning. Trans. AIEE, 66, 577–585.

More recently, a review of lightning photography containing numerous references has been published by Uman (1969) "Lightning", New York, McGraw-Hill, Chapter 2.

In the original Boys camera design, a pair of matched lenses are rotated in front of a stationary film plane to produce opposite displacements of the photographic images as the discharges developed in time. Knowing the rotation frequency and focal lengths of the lenses, the measure of image displacement was sufficient to determine the angular velocity at which the images developed. In 1957, Malan reviewed the general theory of lightning photography and presented an improved camera design in which a loop of film was continuously moved behind a stationary lens.

All of the cameras previously used for time-resolved lightning photography have a rather limited field of view which typically is about 0.5 ster. The desirability to obtain larger fields, of course, has been recognized, although the efforts along this line have met with limited success. In particular, the results have produced undersirable complexities and increased costs. For the most part, increases in the field have been obtained by the use of multiple lenses or, by the use of several cameras operating simultaneously. An example of this latter type of camera is disclosed in a publication by Kettler, C. J., (1940) "Cameras Designed for Lightning Studies", Photo Technique, May 38–43.

Objects of the Present Invention

It is therefore a principle object of the present invention to produce an unusually simple, inexpensive all-sky camera for use in time-resolved lightning photography; the camera having an all-sky filed of view and further being capable of providing varying degrees of resolution.

A further object is to produce an all-sky camera for time-resolved lightning photography capable of providing information regarding the complex luminous processes occurring during lightning discharges by a method which is independent of the orientation of the lightning channel or the location of the discharge in the field of view.

Other objects will become more apparent in the ensuing description.

BRIEF DESCRIPTION OF THE DRAWINGS

The present invention is illustrated in the accompanying drawings of which.

DETAILED DESCRIPTION OF THE INVENTION

Figure 1:
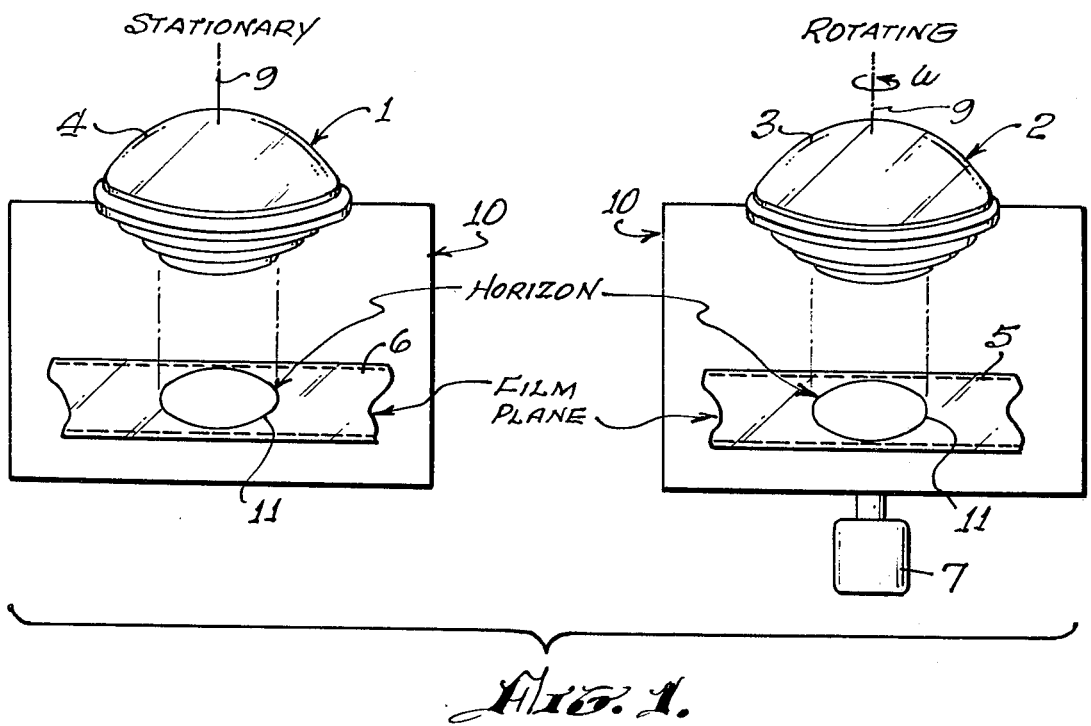
FIG. 1 is a schematic illustrating in particular the lens and film members used in the present cameras.

FIG. 1 illustrates a camera system including a pair of cameras 1 and 2 proximately disposed in a horizontal plane, each camera having a lens 3 and 4 as well as a film strip 5 and 6. A casing 10 houses the functional components.

One of the features of the invention is the use of identical, so-called fisheye lenses pointing vertically to view substantially the entire sky and its horizon so as to focus lightning discharges or other optical targets of interest on its film member which, manifestly, is mounted in the focal plane of the lens. Each lens should be of a type having a good equidistant projection - of - zenith angle to facilitate analysis of the discharge data. For example, one such arrangement employed 35 mm Nikon Photomic FTN cameras equipped with 220°Fisheye Nikkor lenses (6 mm, $f$ 5.6). Obviously, other arrangements are possible. For example, a large format camera arrangement also has been constructed using 300 mm lenses viewing 40 cm diameter parabolic reflectors to obtain the desired all-sky view. This arrangement has been of particular use in analyzing and providing data relative to lightning discharge return-stroke measurements. Other optical arrangements could utilize spherical reflectors is desired.

Figure 2:
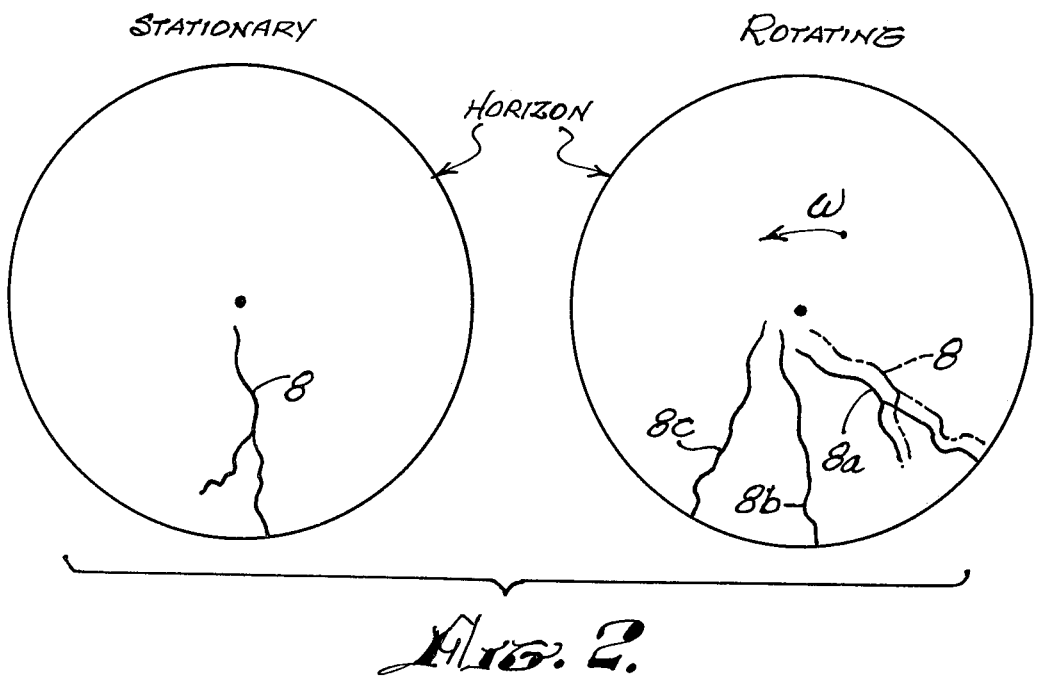
FIG. 2 is a somewhat schematic representation of camera data obtained by the FIG. 1 camera arrangement.

Another feature of the invention is the fact that, generally speaking, one of the cameras is rotatably movable relative to the other to permit the lightning data to be analyzed by measuring the film-recorded angular deviation produced by the relative rotational movement. For example, as shown in FIG. 1, a synchronous motor 7 is used to rotate camera 2 at a fixed rotational speed of either 1 rps or 10 rps. Concurrently, camera 1 is maintained in its stationary disposition so that images formed on the film of camera 2 will have a certain angular deviation relative to the image on the stationary lens. This fact is schematically illustrated by FIG. 2 which shows that an image 8 formed on stationary camera 1 is rotatably displaced by camera 2 due to the fact camera 2 is rotated about its vertical axis 9 at an angular speed of rotation ($\omega$) while camera 1 remains stationary. Consequently, image 8 is displaced on camera 2 as shown by the time history of the discharge recorded as image 8a, 8b and 8c. Thus, this relatively simple all-sky camera system can provide the essential data required for time-resolved photographic studies. Further, the system can utilize varying degrees of resolution controllable by the angular speed, the selection of components and other readily-apparent parameters.

Other arrangements can be employed to achieve the relative rotational movement. Thus, it is feasible and, in some instances, preferable to rotate a disc-like film member, shown as discs 11 and 12 in FIG. 1, rather than both the film and the lens. As shown, disc 12 would be rotated relative to disc 11. The fundamental need is to cause one of the images of the discharge to rotate relative to the other. The data produced provides useful information regardless of the specific arrangement. For example, the Nikon cameras of FIG. 1 with their all-sky fisheye lenses result in a rather low time resolution and they are particularly useful for photographing long, slow air discharges which occasionally propagate for several miles at or just below the cloud base. For return-stroke measurements, the larger format camera using parabolic reflector optics has proven advantageous. Such all-sky cameras are particularly well-suited for studies of fast propagation speeds of return strokes. For return-stroke study the rotational film motion can be controlled so as to be constantly perpendicular to the image of a vertical lightning channel. Further, the camera is advantageous since the film speed, $V = R\omega$, is highest close to the horizon image identified as such in FIG. 1. It also is possible to obtain better time-resolution by employing counter-rotating cameras although this advantage is somewhat at the expense of achieving a well-defined direction of the discharge. Counter-rotation, of course, would be accomplished by rotating camera 1 about its axis 9.

Using the all-sky camera system which has been described, it is possible, in analyzing the resulting data, to use a method that is independent of both the orientation of the lighting channel and the location of the discharge in the field of view. Such an analytical technique is possible if, as will be described, the same source points are measured on the images produced by both cameras.

Thus, to be specific, the location of point image in the stationary focal plane can be specified by the polar coordinates $R_s(t)$ and $O_s(t)$ and the polar coordinates in the rotating planes can be identified as $R_r(t)$ and $O_r(t)$. The designators, $R_s$ and $R_r$ are the radii locations of the stationary and rotating cameras, respectively; while the designators $O_s$ and $O_r$ are the respective zenith angles. The relations between these time-derivatives of the rotated and stationary coordinates will, in general, be $$\frac{dr_r}{dt} = \frac{dr_s}{dt}$$

and $$r_r \frac{d\theta_r}{dt} = \frac{d\theta_s}{dt} - \omega r_s$$

where $\omega$ is the angular speed of rotation in radians per second. Integrating these two equations between any two points on the images provides $\Delta r_r = \Delta r_s$ and $\Delta\theta_r = \Delta\theta_s - \omega\Delta t$. Thus, to determine the time interval, $\Delta t$, required for a particular luminous feature to develop, one simple measures the appropriate angular deviations $\Delta \theta_r$ and $\Delta \theta_s$, between the rotating and stationary images at the same radius and $\Delta t = (\Delta \theta_s - \Delta \theta_r)/\omega$.

Consequently, as previously stated, the data analysis is independent of lightning channel orientation or the location of the discharge in the field of view providing, as indicated, the same source points are measured. This requirement is satisfied by assuring that the angular deviation measurements ($\Delta \theta$) are taken at the same radius.

The present camera system is primarily advantageous in that it provides an all-sky field of view which allows any visible lightning channel to be recorded. Further, the arrangement is unusually simple, inexpensive and easily maintained as a field experimental instrument for long periods of time. It is, as has been stated, an extension of the Boys camera and its later variations, although all of these cameras required a relative motion between the lens and film to displace the lightning image as the discharge develops. In particular, the all-sky arrangement permits the data to be resolved by the equation $\Delta t = \Delta\theta/\omega$ simply by measuring angular deviation at the same radius. Consequently, the arrangement expands and simplifies time-resolved lightning photography in a manner that should significantly benefit these studies and provide useful information on a scale that heretofore has not been achieved.

Obviously many modifications and variations of the present invention are possible in the light of the above teachings. It is therefore to be understood that within the scope of the appended claims the invention may be practiced otherwise than as specifically described.

I claim:

1. All-sky camera apparatus for time-resolved lightning photography comprising:
   a pair of cameras disposed a spaced distance one from the other in a horizontal plane,
   each of said cameras including:
      a lens member and
      a film member disposed in the focal plane of the lens member; both of said members having an axis of rotation pointed vertically and said lens members both being substantially identical to the extent that both are adapted to view substantially the entire sky for imaging in identical manners lightning discharges occurring in the sky on their respective film member, and
   means for rotating the image formed in at least one of said cameras about said common rotational axis, said rotation being at a fixed angular velocity relative to image formed on the film member of said other camera,
   whereby an image of a particular lightning discharge is recorded by both cameras simultaneously for permitting lightning data to be analyzed by measuring the film-recorded angular deviation produced by said relative rotation.

2. The apparatus of claim 1 wherein said means for producing said relative rotation includes a drive means simultaneously rotating both said film and lens members of said one camera.

3. The apparatus of claim 1 where the film member of one of the cameras is maintained in a stationary disposition to produce said relative rotational movement.

4. The apparatus of claim 1 wherein the lens member of both of said cameras is a fisheye lens.

5. The apparatus of claim 1 wherein said means for producing said relative rotation includes a continuously-driven synchronous motor.

6. The appparatus of claim 1 wherein the exposed portion of said film members is directionally controlled for maintaining said films constantly perpendicular to images produced by vertical lightning discharge strokes.

\* \* \* \* \*